July 13, 1954 F. SHERRIFF 2,683,546
CLAMP AND ROTATING MECHANISM FOR INDUSTRIAL TRUCKS
Filed March 1, 1950 3 Sheets-Sheet 1

INVENTOR.
Fred Sherriff
BY
Attys

July 13, 1954        F. SHERRIFF        2,683,546
CLAMP AND ROTATING MECHANISM FOR INDUSTRIAL TRUCKS
Filed March 1, 1950        3 Sheets-Sheet 2
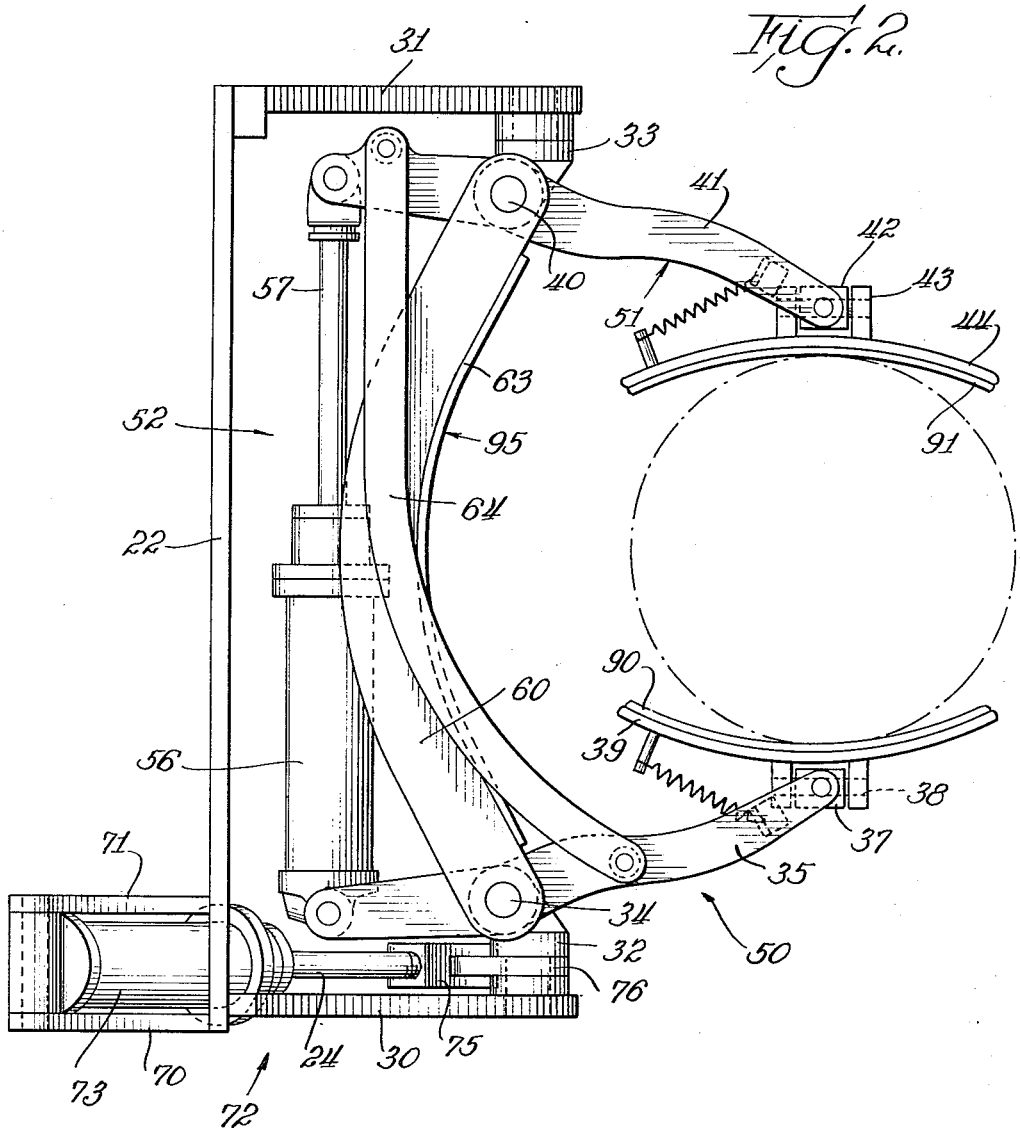
INVENTOR.
Fred Sherriff July 13, 1954  F. SHERRIFF  2,683,546
CLAMP AND ROTATING MECHANISM FOR INDUSTRIAL TRUCKS
Filed March 1, 1950  3 Sheets-Sheet 3
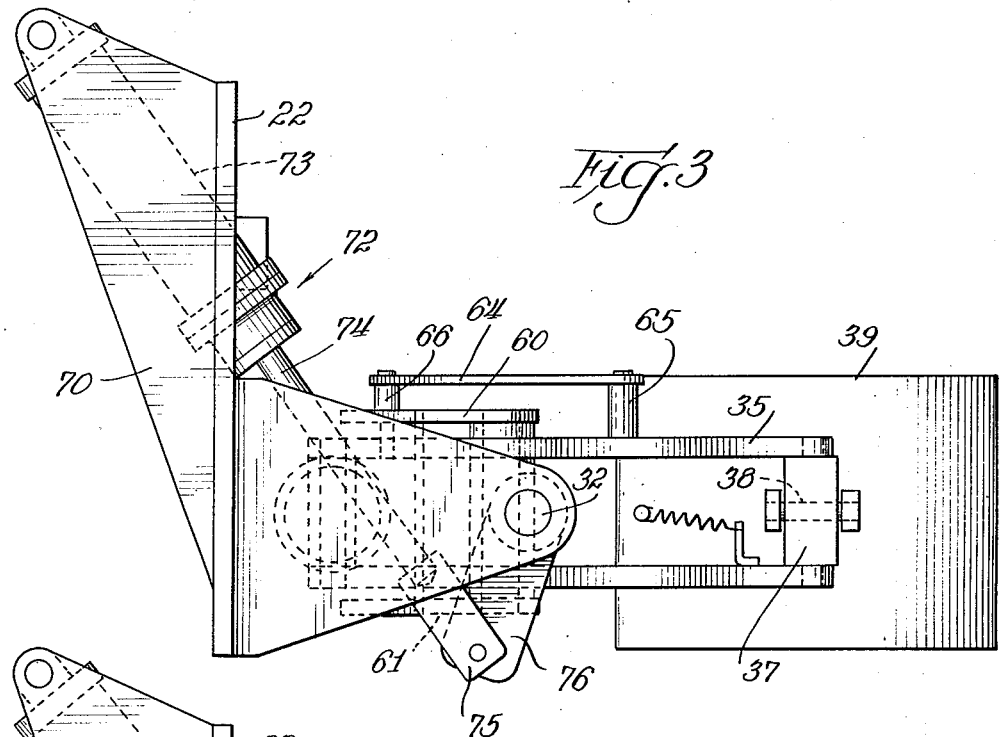
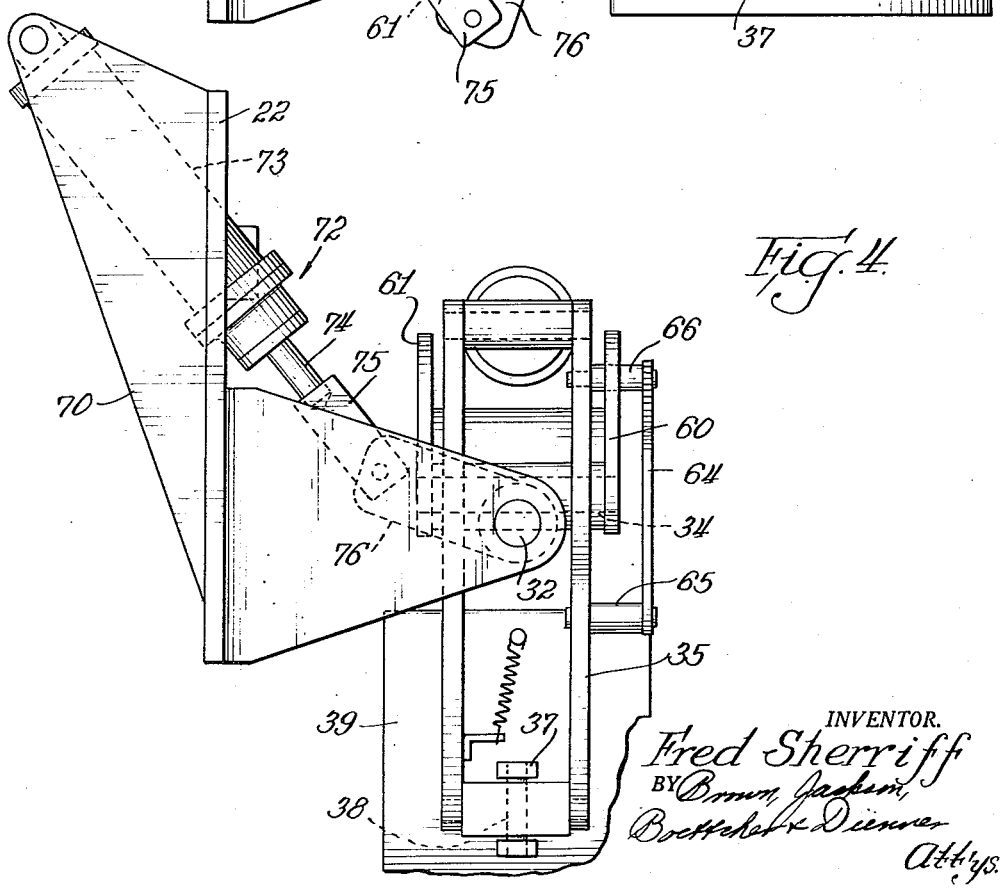
INVENTOR.
Fred Sherriff Patented July 13, 1954

2,683,546

UNITED STATES PATENT OFFICE 2,683,546

CLAMP AND ROTATING MECHANISM FOR INDUSTRIAL TRUCKS

Fred Sherriff, Battle Creek, Mich., assignor to Clark Equipment Company, Buchanan, Mich., a corporation of Michigan Application March 1, 1950, Serial No. 147,005

7 Claims. (Cl. 214—652)

My invention relates to a clamp and rotating mechanism for an industrial truck.

It is an object of my invention to provide a clamp and rotating mechanism for an industrial truck which is capable of clamping a load and then rotating the load about an axis extending transversely of the truck.

It is a further object of my invention to provide a clamp and rotating mechanism of a character, and arranged with respect to the truck, to be disposed a minimum spaced distance with respect to the supporting wheels of the truck so as to provide a maximum load carrying capacity.

I propose to accomplish the aforementioned objects by providing a clamp and rotating mechanism which comprises a plate member mounted to the carriage of the truck for movement therewith and a pair of parallel support members mounted on and extending forwardly from the plate member in horizontal spaced relation. A pair of trunnion members are rotatably mounted one at the forward end of each of the support members inwardly of the latter about a common horizontal axis extending transversely of the truck. A pair of clamp frames, each comprising a pair of parallel spaced apart arm members, are rockably mounted intermediate of their ends one to each of the trunnions about axes extending parallel to a vertical plane passing through the lengthwise axis of the truck. Pivotally secured to the one ends of the clamp frames are a pair of clamp pads which are formed to conform to the shape of the load to be engaged. Between the opposite ends of the clamp frames a hydraulic piston and cylinder assembly is mounted for effecting movement of the clamp pads toward and away from each other. Rotation of the clamping mechanism is effected by means of a hydraulic piston and cylinder assembly which extends forwardly angularly downwardly through the vertical plate member. The hydraulic piston and cylinder assembly is mounted at one end thereof to the rear of the vertical plate member and at its other end has connection with a crank arm secured to one of the trunnions. By mounting the hydraulic piston and cylinder assembly rearwardly of the vertical plate member the clamping mechanism of my present invention is carried closely adjacent the vertical plate member.

Although the load carrying capacity of a truck is fixed by design, the load carrying capacity of an attachment mounted to the truck depends on the perpendicular distance between the center of gravity of a load carried by the attachment and the forward axle of the truck. That is to say, the greater the distance between the center of gravity of the load and the forward axle of the truck, the lesser the weight that can be handled. Conversely, the shorter the distance, the heavier the weight that can be handled. The clamping mechanism of my invention is adapted to engage a load closely adjacent the plate member, thereby reducing the distance between the center of gravity of a load and the forward axle of the truck. I have further reduced this distance to a minimum by providing a concave saddle member between the trunnions which thus permits an engaged load to extend beyond the transverse horizontal axis of rotation of the clamping mechanism.

The above, and other objects and advantages of my invention will appear from the detail description.

Now, in order to acquaint those skilled in the art with the manner of constructing and using devices embodying the principles of my invention, I shall describe in connection with the accompanying drawings a preferred embodiment of my invention.

In the drawings:

Figure 2 is a plan view of the clamping and rotating mechanism of my present invention;

Figure 3 is a side elevational view of the clamping and rotating mechanism of my present invention showing the clamp means rotated 90° from the position in Figure 1; and Figure 4 is a side elevational view of the clamping and rotating mechanism in the same position as shown in Figure 1.

Figure 1:
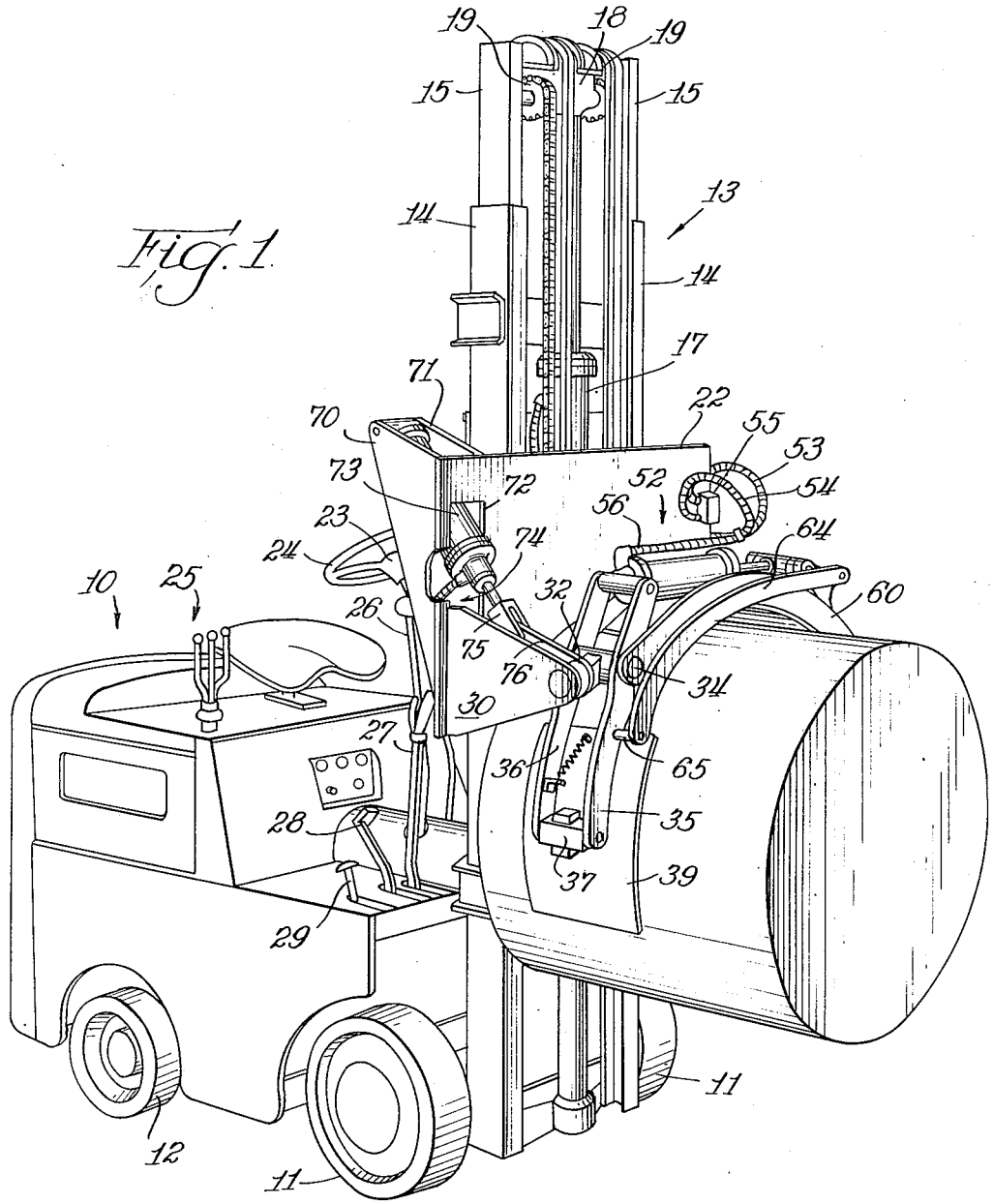
Figure 1 is a perspective view of a conventional type of industrial truck with which my present invention has been embodied.

Referring now to Figure 1, there is shown a conventional industrial truck, indicated generally by the reference numeral 10, having a pair of forward driving wheels 11 and a pair of rear steering wheels 12. A normally vertically extending mast, indicated generally by the reference numeral 13, is provided at the forward end of the truck 10, and comprises two pairs of channel-shaped vertically extending members, such as members 14—14 and 15—15, which are telescopically arranged and actuated in a known manner by conventional hydraulic piston and cylinder means 17. Secured between the upper ends of the channel members 15—15 is a crosshead 18 having sprocket wheels 19 journaled at the ends thereof, over which chains 20 are trained. The chains 20 at one of the ends thereof are connected to the cross brace member 21 interconnecting the channel members 14—14 and at their other ends are connected to a conventional carriage member (not shown) which supports, in a conventional manner, a vertically extending plate member 22. The plate member 22 provides a support for the clamp and rotating mechanism of my present invention, which I shall describe in detail hereinafter.

The truck 10 is provided with a steering column 23 to which a hand steering wheel 24 is mounted at the upper end thereof, which hand steering wheel may be utilized by the operator of the truck for maneuvering the latter. The truck 10 is additionally provided with a conventional power plant and clutch and drive means. Controls which may be used by the operator for raising or lowering the mast and for effecting operation of the clamp and rotating mechanism of my present invention are indicated generally by the reference numeral 25. A gear shift lever 26, a hand brake 27, foot brake 28, and clutch pedal 29, are also provided for the operator.

Extending forwardly of the vertical plate member 22 at the lower corner portions thereof are a pair of horizonally spaced apart parallel bracket members 30 and 31. Rotatably supported in the outer ends of the bracket members 30 and 31, inwardly thereof about a common horizontal axis extending transversely of the truck, are a pair of stub shafts or trunnion members 32 and 33. Each of the stub shafts or trunnion members 32 and 33 has an opening therethrough on an axis parallel to a vertical plane passing through the lengthwise axis of the truck. Journaled in the opening in the trunnion member 32 is a pin 34 which provides a support at its outer ends for a clamp frame 50 comprising a pair of parallel spaced apart arm members 35 and 36 mounted intermediate of their ends. A clamp pad stud member 37 is journaled at its ends in the arm members 35 and 36 adjacent one end thereof. Extending transversely of stud member 37 is a pin 38 which, at the outer ends, supports a clamp pad 39 which is conformably formed to engage cylindrical loads. If the frictional engagement between the clamp pad 39 and a load is unsatisfactory, alining 90 having a high coefficient of friction may be applied to the engaging surface of the clamp pad 39. Journaled in the trunnion member 33 is a pin 40 for supporting a clamp frame 51 comprising a pair of parallel spaced apart arm members, one of which is shown at 41, mounted intermediate of their ends. The frame 51 is of the same shape as the frame 50 carried by the pin 34, but is disposed in opposing relation. Rotatably mounted adjacent one end of the frame 51 is a clamp pad stud member 42, like member 37, which carries a pin 43 extending transversely thereof. The pin 43 provides for the rotatable support of a clamp pad 44 having a frictional face 91, like pad 39. It will be realized that the clamp pads 39 and 44 may be of other than concave configuration in order to engage other than cylindrical loads.

Mounted between the ends of the clamp frames 50 and 51, opposite the ends to which the clamp pads 39 and 44 are rotatably secured, is a hydraulic piston and cylinder assembly 52 comprising a cylinder 56 and a piston rod 57. Suitable fluid lines 53 and 54 are connected at one of their ends to a terminal block 55 mounted on the forward side of the vertical plate member 22. The fluid line 53 is connected at its other end to the rear end of the cylinder 56 of the hydraulic piston and cylinder assembly 52 and fluid line 54 is connected at its other end to the forward end of the cylinder 56. The terminal block 55 is suitably connected by fluid lines to the hydraulic pump carried by the truck 10 and fluid is selectively admitted into either the forward or the rear end of the cylinder 56 by means of one of the control levers, indicated generally at 25, which may be actuated by the operator of the truck. When fluid under pressure is admitted to the rear end of cylinder 56, the piston rod 57 is extended causing the clamp frames 50 and 51 to rotate about the pins 34 and 40, respectively, urging the clamp pads 39 and 44 towards each other. When fluid under pressure is admitted to the forward end of the cylinder 56, the piston rod 57 is retracted causing the clamp frames 50 and 51 to rotate about the pins 34 and 40, respectively, urging the clamp pads 39 and 44 away from each other.

Synchronous clamping movement of the clamp pads 39 and 44 is attained by providing a curved tie bar or link 64 between the clamp frames 50 and 51. One end of the tie bar 64 is rotatably mounted to the clamp frame 50 on one side of the axis of rotation of the clamp frames 50 and 51, and the other end of the tie bar 64 is rotatably mounted to the clamp frame 51 on the opposite side of the axis of rotation of the clamp frames 50 and 51 equidistant from the axis of rotation as the one end of tie bar 64. The tie rod 64 is spaced from the clamp frames 50 and 51 by means of collar members 65 and 66 respectively.

In order to maintain the bracket members 30 and 31 the proper distance apart under all conditions of loading and to synchronize rotary movement of the clamp frames 50 and 51, a saddle member 95 is provided for interconnecting the respective ends of the pins 34 and 40 together. The saddle member 95 comprises arcuate brace members 60 and 61, and a curved plate member 63 mounted to the concave edges thereof which aids in supporting loads of large diameter. It will be observed that by providing an arcuate shaped saddle member 95, a load engaged by the clamping mechanism may extend beyond the transverse horizontal axis of rotation of the latter, thereby minimizing the distance between the center of gravity of the load and the front axle of the truck which maximizes the load carrying capacity of the clamp and rotating mechanism.

The rotating mechanism of my present invention is disposed adjacent the left side of the truck, as viewed from the front. Secured to the rear surface of the vertical plate member 22 are a pair of horizontally spaced apart triangular shaped bracket members which, at their upper ends, provide a rotatable support for a hydraulic piston and cylinder assembly, indicated generally at 72. The hydraulic piston and cylinder assembly 72 comprises a cylinder 73 and a piston rod 74. The forward end of the cylinder 73 and the piston rod 74 are adapted to extend forwardly angularly downwardly of the plate member 22 through an opening therein. The outer end of the piston rod 74 is provided with a clevis member 75 which is pivotally connected to the outer end of a crank arm 76 secured to the trunnion 32, inwardly of bracket member 30. Hydraulic fluid lines are suitably connected to the cylinder 73 of the hydraulic piston and cylinder assembly 72 and fluid is selectively admitted to the cylinder 73 by the operator of the truck for selectively extending or retracting the piston rod 74. When fluid under pressure is admitted to the rear end of cylinder 73, the piston rod 74 is extended and the crank arm 76, together with the clamping mechanism of my present invention, is rotated counterclockwise from the position shown in Figures 1 and 4 to the position shown in Figure 3. When fluid under pressure is admitted to the forward end of cylinder 73, the piston rod 74 is retracted and the crank arm 76, together with the clamping mechanism, is rotated in a clockwise direction from the position shown in Figure 3, to the position shown in Figures 1 and 4.

The following is a description of the operation of the clamping and rotating mechanism of my present invention:

When it is desired to pick up a cylindrical load in a horizontal position, the operator of the truck manipulates the necessary levers of the group at 25 to admit fluid under pressure to the forward ends of both of the cylinders 56 and 73, so as to retract the piston rods 57 and 74, respectively. When the piston rods 57 and 74 are in a retracted position, the clamp pads 39 and 44 are spread apart and the clamping mechanism is disposed in a vertical position. The operator then raises the vertical plate member 22 to the desired height and maneuvers the truck adjacent the load to be picked up. The vertical plate member 22 is then lowered on the mast 13 until the clamp pads 39 and 44 are approximately located on the diameter of the cylindrical load to be engaged. Fluid under pressure is then admitted through line 54 to the rear end of cylinder 56 of the hydraulic piston and cylinder assembly 52 extending the piston rod 57, and thus moving the clamp pads 39 and 44 toward each other into engagement with the load. After the load has been firmly clamped, the plate member 22 is raised on the carriage 13 and the truck 10 driven to the desired location. If the load is to be deposited in a horizontal position, the operator lowers the vertical plate member 22 until the load engages the ground. He then admits fluid under pressure through line 53 to the forward end of cylinder 56 of the hydraulic piston and cylinder assembly 52 so as to retract piston rod 57, thereby separating the clamp pads 39 and 44 for releasing the load. The vertical plate member 22 is then raised and the truck 10 driven away.

When the operator of the truck desires to pick up a load in a vertical position, he manipulates the appropriate control lever of the group at 25 for admitting fluid under pressure through fluid line 53 to the forward end of the cylinder 56 of the hydraulic piston and cylinder assembly 52, so as to retract the hydraulic piston rod 57, thereby spreading the clamp pads 39 and 44. Simultaneously, fluid under pressure is admitted to the rear end of cylinder 73 of the hydraulic piston and cylinder assembly 72 so as to extend the piston rod 74, thereby rotating the clamping mechanism to a horizontal position. The truck is then maneuvered until the clamp pads 39 and 44 are located approximately at the diameter of the load to be picked up. The operator then manipulates the appropriate control lever of the group at 25, admitting fluid under pressure through hose line 54 to the rear end of cylinder 56 of the hydraulic piston and cylinder assembly 52 so as to extend the piston rod 57, thereby urging the clamp pads 39 and 44 toward each other so as to engage the load thereby. After the load has been engaged by the clamp pads 39 and 44, the vertical plate member 22 is raised permitting the truck to be driven away. The load may be deposited in a manner previously described.

From the foregoing description it will be observed that the clamp construction may be disposed in either a vertical or horizontal position, and thus is adapted to engage loads in either a horizontal or a vertical position. Furthermore, a load may be engaged while in a horizontal position and then rotated to a vertical position or vice versa.

While I have shown and described what I believe to be a preferred embodiment of my invention, it will be understood that various modifications and rearrangements may be made therein without departing from the spirit and scope of my invention.

I claim:

1. For use with an industrial truck having an upwardly extending mast including a carriage movable lengthwise thereon, a combination clamp and rotating mechanism comprising, a plate member adapted to be mounted on the carriage, a pair of support members mounted on and extending forwardly from said plate member in horizontal spaced relation, a pair of stub shafts one rotatably mounted on each of said support members about a horizontal axis extending transversely of the truck, a pair of clamp frames one rockably mounted to each of said stub shafts about axes extending parallel to a vertical plane passing through the lengthwise axis of the truck, brace means interconnecting said stub shafts and arranged so as to permit an engaged load to intersect the axis of rotation of the stub shafts, means for effecting rotation of said stub shafts, and means associated with said clamp frames for rocking said clamp frames about said stub shafts.

2. For use with an industrial truck having an upwardly extending mast including a carriage movable lengthwise thereon, a combination clamp and rotating mechanism comprising, a plate member adapted to be mounted on the carriage, a pair of support members mounted on and extending forwardly from said plate member in horizontal spaced relation, a pair of stub shafts one rotatably mounted on each of said support members about a horizontal axis extending transversely of the truck, a pair of clamp frames one rockably mounted to each of said stub shafts about axes extending parallel to a vertical plane passing through the lengthwise axis of the truck, brace means interconnecting said stub shafts, a crank arm rigidly mounted to one of said stub shafts, a hydraulic piston and cylinder assembly extending through said plate member and mounted at one of its ends to said plate member rearwardly thereof and having connection at its other end with said crank arm for rotating the latter, and means associated with said clamp frames for rocking said clamp frames about said stub shafts.

3. For use with an industrial truck having an upwardly extending mast including a carriage movable lengthwise thereon, a combination clamp and rotating mechanism comprising, a plate member adapted to be mounted on the carriage, a pair of parallel support members mounted on and extending forwardly from said plate member in horizontal spaced relation, a pair of stub shafts one rotatably mounted at the forward end of each of said support members inwardly of the latter about a common horizontal axis extending transversely of the truck, a pair of clamp frames one rockably mounted to each of said stub shafts about axes extending parallel to a vertical plane passing through the lengthwise axis of the truck, brace means interconnecting said stub shafts, a crank arm rigidly mounted to one of said stub shafts, a hydraulic piston and cylinder assembly extending forwardly and angularly downwardly through said plate member, said hydraulic piston and cylinder assembly being mounted at one of its ends to said plate member rearwardly thereof and having connection at its other end with the outer end of said crank arm for rotating the latter, and means for rocking said clamp frames about said stub shafts.

4. For use with an industrial truck having an upwardly extending mast including a carriage movable lengthwise thereon, a combination clamp and rotating mechanism comprising, a plate member adapted to be mounted on the carriage, a pair of support members mounted on and extending forwardly from said plate member in horizontal spaced relation, a pair of stud shafts one rotatably mounted on each of said support members about a horizontal axis extending transversely of the truck, a pair of clamp frames rockably mounted intermediate of their ends one to each of said stub shafts about axes extending parallel to a vertical plane passing through the lengthwise axis of the truck, brace means interconnecting said stub shafts and arranged so as to permit an engaged load to intersect the axis of rotation of the stub shafts, a hydraulic piston and cylinder assembly having connection between one of the ends of each of said clamp frames for urging the other ends of the latter toward and away from each other, and means carried by said plate member for effecting rotation of said stub shafts.

5. For use with an industrial truck having an upwardly extending mast including a carriage movable lengthwise thereon, a combination clamp and rotating mechanism comprising, a plate member adapted to be mounted on the carriage, a pair of support members mounted on and extending forwardly from said plate member in horizontal spaced relation, a pair of stub shafts one rotatably mounted on each of said support members about a horizontal axis extending transversely of the truck, a pair of clamp frames rockably mounted intermediate of their ends one to each of said stub shafts about axes extending parallel to a vertical plane passing through the lengthwise axis of the truck, a rigid link interconnecting opposite ends of said clamp frames at points equidistant from the transverse axis of rotation of said stub shafts for equalizing rocking movement of said clamp frames, a hydraulic piston and cylinder assembly having connection between one of the ends of each of said clamp frames for urging the other ends of the latter toward and away from each other, brace means interconnecting said stub shafts, a crank arm rigidly mounted to one of said stub shafts, and a hydraulic piston and cylinder assembly carried by said plate member and having connection with said crank arm for rotating the latter.

6. For use with an industrial truck having an upwardly extending mast including a carriage movable lengthwise thereon, a combination clamp and rotating mechanism comprising, a plate member adapted to be mounted on the carriage, a pair of parallel support members mounted on and extending forwardly from said plate member in horizontal spaced relation, a pair of stub shafts one rotatably mounted at the forward end of each of said support members inwardly of the latter about a common horizontal axis extending transversely of the truck, a pair of clamp frames rockably mounted intermediate of their ends one to each of said stub shafts about axes extending parallel to a vertical plane passing through the lengthwise axis of the truck, brace means interconnecting said stub shafts, a crank arm rigidly mounted to one of said stub shafts, a hydraulic piston and cylinder assembly extending forwardly and angularly downwardly through said plate member, said hydraulic piston and cylinder assembly being mounted at one of its ends to said plate member rearwardly thereof and having connection at its other end with the other end of said crank arm for rotating the latter, and a hydraulic piston and cylinder assembly having connection between one of the ends of each of said clamp frames for urging the other ends of the latter toward and away from each other.

7. For use with an industrial truck having an upwardly extending mast including a carriage movable lengthwise thereon, a combination clamp and rotating mechanism comprising, a plate member adapted to be mounted on the carriage, a pair of parallel support members mounted on and extending forwardly from said plate member in horizontal spaced relation, a pair of stub shafts one rotatably mounted at the forward end of each of said support members inwardly of the latter about a common horizontal axis extending transversely of the truck, a pair of clamp frames rockably mounted intermediate of their ends one to each of said stub shafts about axes extending parallel to a vertical plane passing through the lengthwise axis of the truck, each of said clamp frames comprising a pair of parallel spaced apart arm members, a pair of clamp pads one pivotally secured between the arm members of each of said clamp frames adjacent one end thereof, a hydraulic piston and cylinder assembly having connection between the opposite ends of said clamp frames for urging the clamp pads at said one end of said clamp frames toward and away from each other, a rigid link interconnecting opposite ends of said clamp frames at points equidistant from the transverse axis of rotation of said stub shafts for equalizing rocking movement of said clamp frames, a concave saddle member interconnecting said stub shafts, a crank arm rigidly mounted to one of said stub shafts, a hydraulic piston and cylinder assembly extending forwardly and angularly downwardly through said plate member, and said last named hydraulic piston and cylinder assembly being mounted at one of its ends to said plate member rearwardly thereof and having connection at its other end with the outer end of said crank arm for rotating the latter.

References Cited in the file of this patent

UNITED STATES PATENTS

| Number | Name | Date |
| --- | --- | --- |
| 1,437,547 | Pope | Dec. 5, 1922 |
| 1,962,700 | Allard | June 12, 1934 |
| 2,390,293 | Colson | Dec. 4, 1945 |
| 2,475,367 | Avery | July 5, 1949 |
| 2,497,118 | Ferrario et al. | Feb. 14, 1950 |
| 2,509,023 | Vogel et al. | May 23, 1950 |
| 2,554,433 | Warren | May 22, 1951 |
| 2,604,220 | Frischmann | July 22, 1952 |
| 2,611,497 | Backofen | Sept. 23, 1952 |
| 2,611,498 | Broersma | Sept. 23, 1952 |